United States Patent
Brinck

(10) Patent No.: US 10,503,741 B2
(45) Date of Patent: Dec. 10, 2019

(54) ELECTRONIC SYSTEM WITH SEARCH MECHANISM AND METHOD OF OPERATION THEREOF

(71) Applicant: Samsung Electronics Co., Ltd., Suwon-si, Gyeonggi-Do (KR)

(72) Inventor: Tom Brinck, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 14/464,229

(22) Filed: Aug. 20, 2014

(65) Prior Publication Data

US 2016/0055219 A1    Feb. 25, 2016

(51) Int. Cl.
*G06F 16/248*   (2019.01)
*G06F 16/335*   (2019.01)
*G06F 16/2457*  (2019.01)
*G06F 16/2452*  (2019.01)
*G06F 16/332*   (2019.01)
*G06F 16/242*   (2019.01)
*G06F 16/957*   (2019.01)

(52) U.S. Cl.
CPC .......... *G06F 16/248* (2019.01); *G06F 16/242* (2019.01); *G06F 16/2452* (2019.01); *G06F 16/24575* (2019.01); *G06F 16/335* (2019.01); *G06F 16/3322* (2019.01); *G06F 16/9577* (2019.01)

(58) Field of Classification Search
CPC combination set(s) only.
See application file for complete search history.

(56) References Cited

U.S. PATENT DOCUMENTS

| | | | |
|---|---|---|---|
| 6,590,586 B1* | 7/2003 | Swenton-Wall | G06F 16/54 715/730 |
| 7,467,129 B1 | 12/2008 | Bong | |
| 7,693,827 B2 | 4/2010 | Zamir et al. | |
| 8,306,927 B1* | 11/2012 | Heidenreich | G06N 5/02 706/11 |
| 8,341,196 B2 | 12/2012 | Immonen et al. | |
| 8,504,437 B1 | 8/2013 | Agarwal et al. | |
| 8,515,979 B2 | 8/2013 | Mehta | |
| 8,826,145 B1* | 9/2014 | Kirkpatrick | G06F 17/30867 715/239 |
| 2003/0135582 A1 | 7/2003 | Allen et al. | |
| 2007/0027848 A1 | 2/2007 | Howard et al. | |
| 2007/0088680 A1 | 4/2007 | Suave et al. | |
| 2007/0226189 A1* | 9/2007 | Piekos | G06F 17/30899 |

(Continued)

OTHER PUBLICATIONS

Li et al., "Efficient Type-Ahead Search on Relational Data: a Tastier approach", Jun. 29-Jul. 2, 2009, pp. 1-12, Providence, Rhode Island, USA.

(Continued)

*Primary Examiner* — Etienne P Leroux

(57) ABSTRACT

An electronic system includes: a control unit configured to: receive information related to an user entry under a search context, perform searches based on the information for searching within a plurality of a destination, and a user interface, coupled to the control unit, configured to present search results based on the searches, wherein one instance of the search results is different from another instance of the search results for presenting the search results for the plurality of the destination.

21 Claims, 6 Drawing Sheets

(56) References Cited

U.S. PATENT DOCUMENTS

| | | | |
|---|---|---|---|
| 2007/0294225 A1 | 12/2007 | Radlinski et al. | |
| 2008/0183669 A1 | 7/2008 | Gaurav et al. | |
| 2008/0294619 A1* | 11/2008 | Hamilton, II | G06F 16/3326 |
| 2010/0114874 A1* | 5/2010 | Hansson | G06F 16/951 707/722 |
| 2010/0166047 A1* | 7/2010 | Kim | G01S 19/30 375/150 |
| 2010/0185605 A1* | 7/2010 | Chu | H04W 4/02 707/722 |
| 2010/0198626 A1* | 8/2010 | Cho | G06Q 10/02 705/5 |
| 2011/0125791 A1 | 5/2011 | Konig et al. | |
| 2011/0208801 A1* | 8/2011 | Thorkelsson | H04L 67/2814 709/203 |
| 2012/0317101 A1* | 12/2012 | Jones | G06Q 30/02 707/723 |
| 2013/0086053 A1* | 4/2013 | Tang | G06F 17/30867 707/723 |
| 2013/0110863 A1* | 5/2013 | Lai | G06F 17/30967 707/767 |
| 2014/0101125 A1* | 4/2014 | Greene | G06F 16/168 707/706 |
| 2014/0214898 A1 | 7/2014 | Shapira et al. | |
| 2014/0215451 A1* | 7/2014 | Nachtigal | G06F 9/445 717/171 |
| 2015/0067494 A1* | 3/2015 | Hattori | G06F 17/212 715/274 |

OTHER PUBLICATIONS

Bast et al., "Type Less, Find More: Fast Autocompletion Search with a Succinct Index", Aug. 6-11, 2006, pp. 1-8, Seattle, Washington, USA.

Pretschner et al., "Ontology Based Personalized Search", IEEE, Nov. 1999, pp. 391-398, Chicago, USA.

Papazoglou et al., "Service-Oriented Computing, Communications of the ACM", Oct. 2003, pp. 25-28, vol. 46, No. 10.

* cited by examiner

ELECTRONIC SYSTEM WITH SEARCH MECHANISM AND METHOD OF OPERATION THEREOF

TECHNICAL FIELD

An embodiment of the present invention relates generally to an electronic system, and more particularly to a system for search mechanism.

BACKGROUND

Modern portable consumer and industrial electronics, especially client devices such as navigation systems, cellular phones, portable digital assistants, and combination devices are providing increasing levels of functionality to support modern life including information search services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Electronic system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

Thus, a need still remains for an electronic system with search mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including: a control unit configured to: receive information related to an user entry under a search context, perform searches based on the information for searching within a plurality of the destination, and a user interface, coupled to the control unit, configured to present search results based on the searches, wherein one instance of the search results is different from another instance of the search results for presenting the search results for the plurality of the destination.

An embodiment of the present invention provides a method of operation of an electronic system including: receiving information related to an user entry under a search context; performing searches with a control unit based on the information for searching within a plurality of the destination; and presenting search results based on the searches, wherein one instance of the search results is different from another instance of the search results for presenting the search results for the plurality of the destination.

An embodiment of the present invention provides a non-transitory computer readable medium including instructions for execution by a control unit including: receiving information related to an user entry under a search context; performing searches based on the information for searching within a plurality of the destination; and presenting search results based on the searches, wherein one instance of the search results is different from another instance of the search results for presenting the search results for the plurality of the destination.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
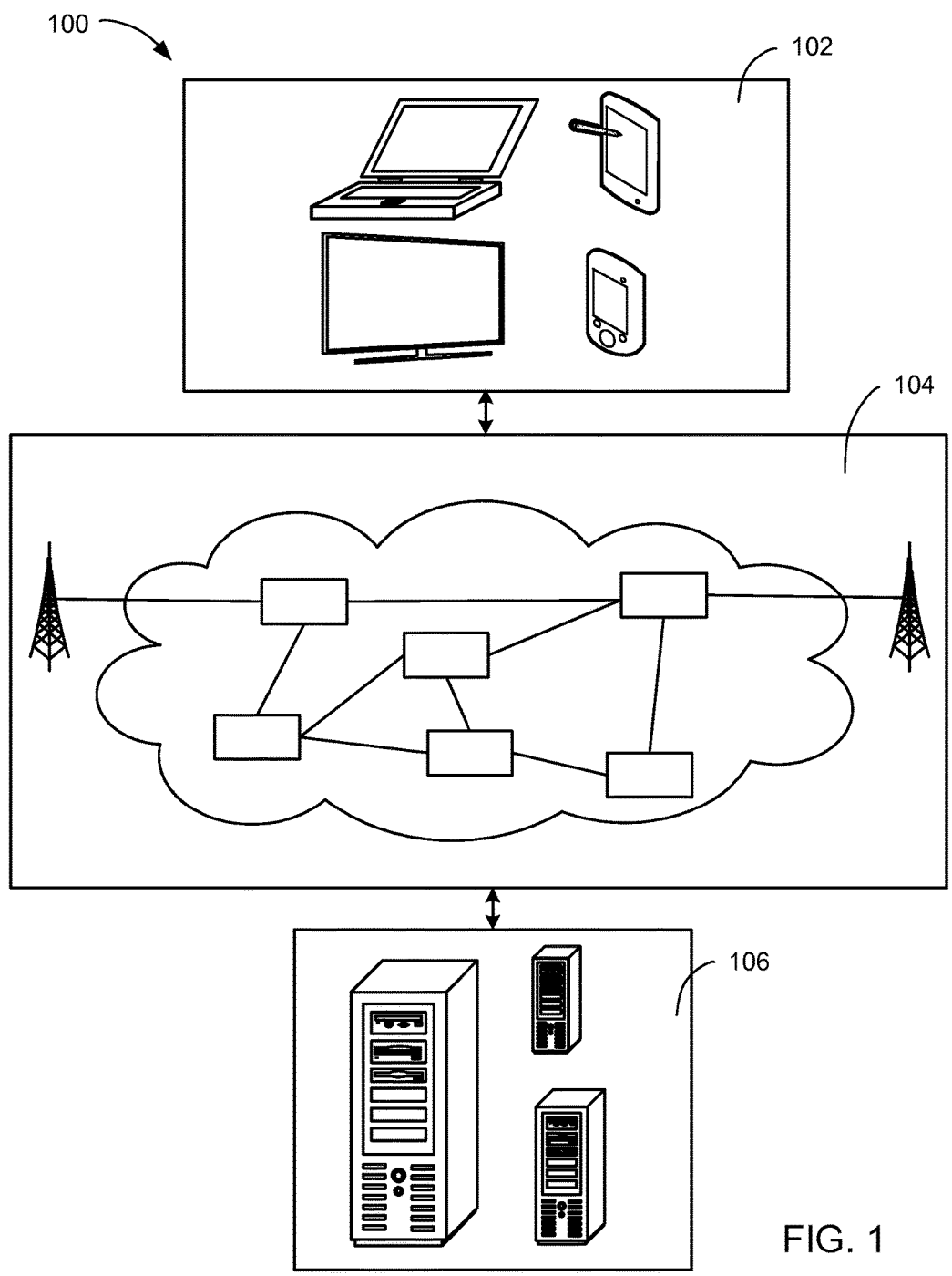
FIG. 1 is an electronic system with search mechanism in an embodiment of the present invention.

The embodiments of the present invention perform searches on a plurality of a destination to obtain search results from the destination. The embodiments of the present invention can present the search results in a plurality of a display format native to each instance of the destination. Further, the embodiments of the present invention can present the search results in the display format optimal for a display context by selecting the destination to present the search results.

The embodiments of the present invention can receive the information related to a user entry under a search context to improve the efficiency of performing a plurality of the search. More specifically, the embodiment of the present invention can perform the search based on the information for searching within the plurality of the destination. As a result, the embodiment of the present invention can present a plurality of the search result based on a plurality of the search, wherein one instance of the search result is different from another instance of the search result for presenting a plurality of the search result for a plurality of the destination.

The embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention.

However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "relevant information" referred to herein includes the geographic information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with search mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telemetric communication system, or other multi-functional mobile communication or entertainment device. The first device 102 can be a standalone device, or can be incorporated with a vehicle, for example a car, truck, bus, aircraft, boat/vessel, or train. The first device 102 can couple to the communication path 104 to communicate with the second device 106.

For illustrative purposes, the electronic system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, a rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, a personal digital assistant, or a cellular phone, and as specific examples, an Apple iPhone™, Android™ smartphone, or Windows™ platform smartphone.

For illustrative purposes, the electronic system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
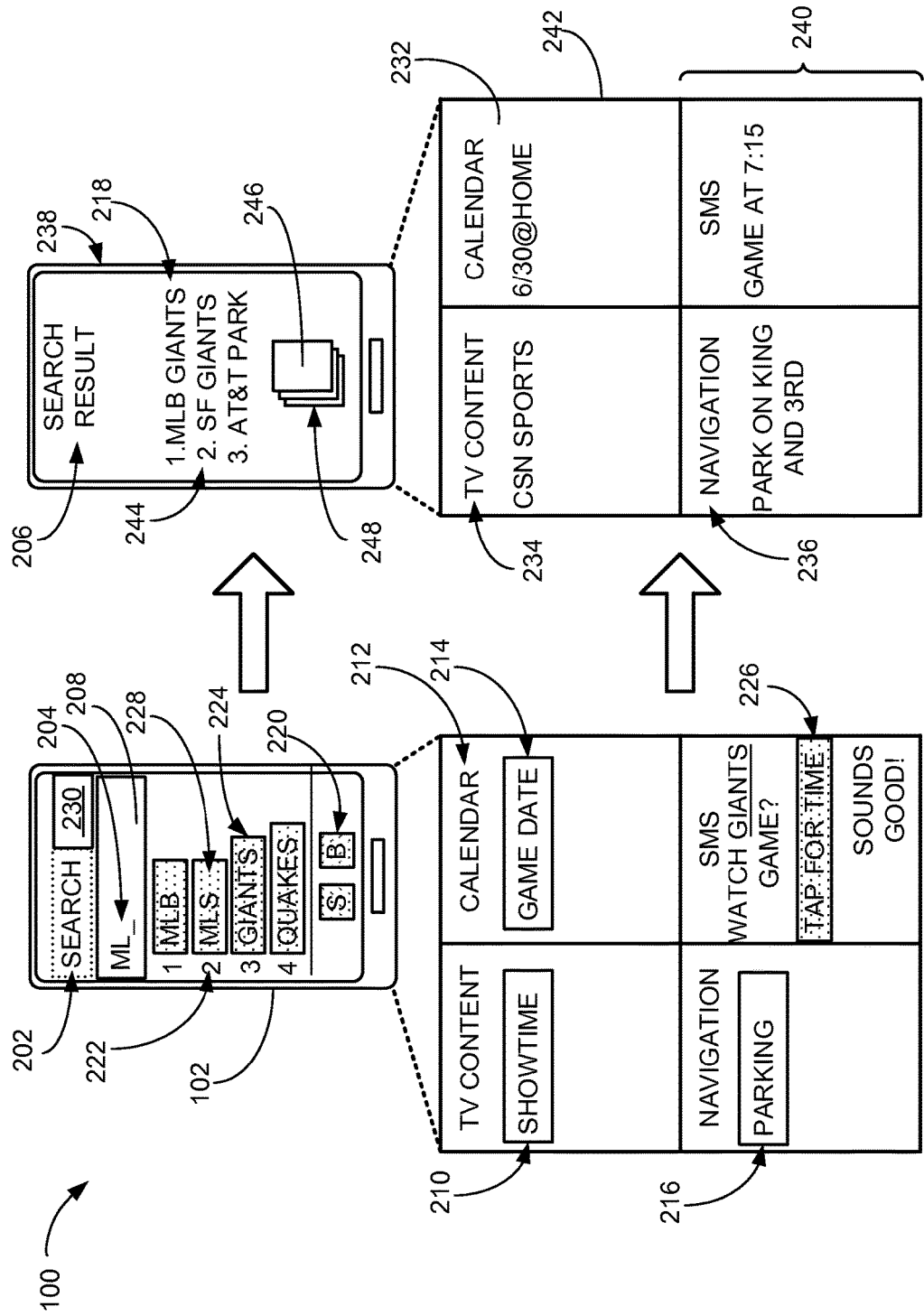
FIG. 2 is an example of a search performed on the first device.

Referring now to FIG. 2, therein is shown an example of a search 202 performed on the first device 102. For clarity and brevity, the discussion of the present invention will focus on the first device 102 displaying the result generated by the electronic system 100. However, the second device 106 of FIG. 1 and the first device 102 can be discussed interchangeably.

The search 202 is a functionality to find information 204. For example, the electronic system 100 can perform the search 202 to obtain a search result 206. The search result 206 is an outcome of the search 202. For further example, the electronic system 100 can perform a plurality of the search 202 on a plurality of the first device 102 to obtain a plurality of the search result 206.

The electronic system 100 can receive the information 204 related to a user entry 208 as a query 210 for the electronic system 100 to perform the search 202. The user entry 208 can represent a manual entry, an audio entry, a gesture, a digital image, a video image, or a combination thereof. The query 210 is a request to seek the search result 206 for the information 204.

A query type 212 is a classification of the query 210. The query type 212 can include a main query 214, a related query 216, or a combination thereof. The main query 214 is a primary instance of the query 210. The related query 216 is a secondary instance of the query 210. For example, the main query 214 can reflect a user's interest 218 of why the user is performing the search 202, recognition of the user's interest 218 by the electronic system 100 to perform the search 202, or a combination thereof. As an example, the main query 214 can represent the information 204 directly entered as part of the user entry 208. The related query 216 can represent a subsidiary instance of the query 210 generated by the electronic system 100 to aid the main query 214.

The electronic system 100 can identify the information 204 from the user entry 208 as a substring 220. The substring 220 is a subset of the query 210 reflecting the information 204 to be searched. For example, the query 210 can represent "Watching the Giants game?" The substring 220 can represent "Giants." For further example, the substring 220 can represent a phrase, a word, a letter, or a combination thereof.

A substring rank 222 is a list of the substring 220 ordered by relevance. For example, a plurality of the substring 220 can be ranked as the substring rank 222 in relation to the query 210. The substring rank 222 can rank a substring candidate 224, which is an option suggested by the electronic system 100 to complete the generation of the query 210. For example, the substring candidate 224 can represent a phrase, a word, a letter, or a combination thereof.

The electronic system 100 can generate a suggestion 226 to be the query 210 for performing the search 202. The suggestion 226 is the query 210 offered by the electronic system 100 in replace of the user entry 208. A term correction 228 is a word generated to correct the user entry 208. For example, the term correction 228 can represent a grammar correction, a spell check, or a combination thereof. The term correction 228 can be generated according to a destination dictionary 230, which is an information repository providing a selection of words, a meaning of the word, a proper pronunciation of the word, a spelling of the word, or a combination thereof. The destination dictionary 230 can represent the information repository unique to a destination 238. More specifically, the destination 238 can include the destination dictionary 230 including a selection of words, a meaning of the word, a proper pronunciation of the word, a spelling of the word, or a combination thereof different from the destination dictionary 230 of other instance of the destination 238.

A display format 232 is an arrangement for displaying a content. For example, the display format 232 can represent a layout to display the search result 206. For further example, the display format 232 can differ based on a destination type 234. More specifically, the display format 232 can be controlled by a feature 236 for each instances of the destination type 234 to present the display format 232 native to the destination type 234.

The display format 232 can include a slideshow 246, which is a layout to display the search result 206. For example, the slideshow 246 can include a plurality of a slide 248 to display each instance of a plurality of the search result 206. More specifically, the slideshow 246 can include the search result 206 from one instance of the destination 238 on one instance of the slide 248 and the search result 206 from another instance of the destination 238 on another instance of the slide 248.

The destination type 234 is a classification of the destination 238, which is a device, an application 240, or a combination thereof to display the search result 206. For example, the destination 238 can represent the first device 102 to display the search result 206. For another example, the destination 238 can represent the application 240 as a software running on the first device 102. The feature 236 can represent a functionality unique to the destination 238.

The display format 232 can include an arrangement of a plurality of a display pane 242, which is an interface to display a content. For example, the display format 232 can include 4 instances of the display pane 242 to display 4 different instances of the search result 206. A result ranking 244 is a list of the search result 206 ordered based on a factor. For example, the result ranking 244 of the search result 206 can base on a relativeness of the search result 206 to the query 210.

Figure 3:
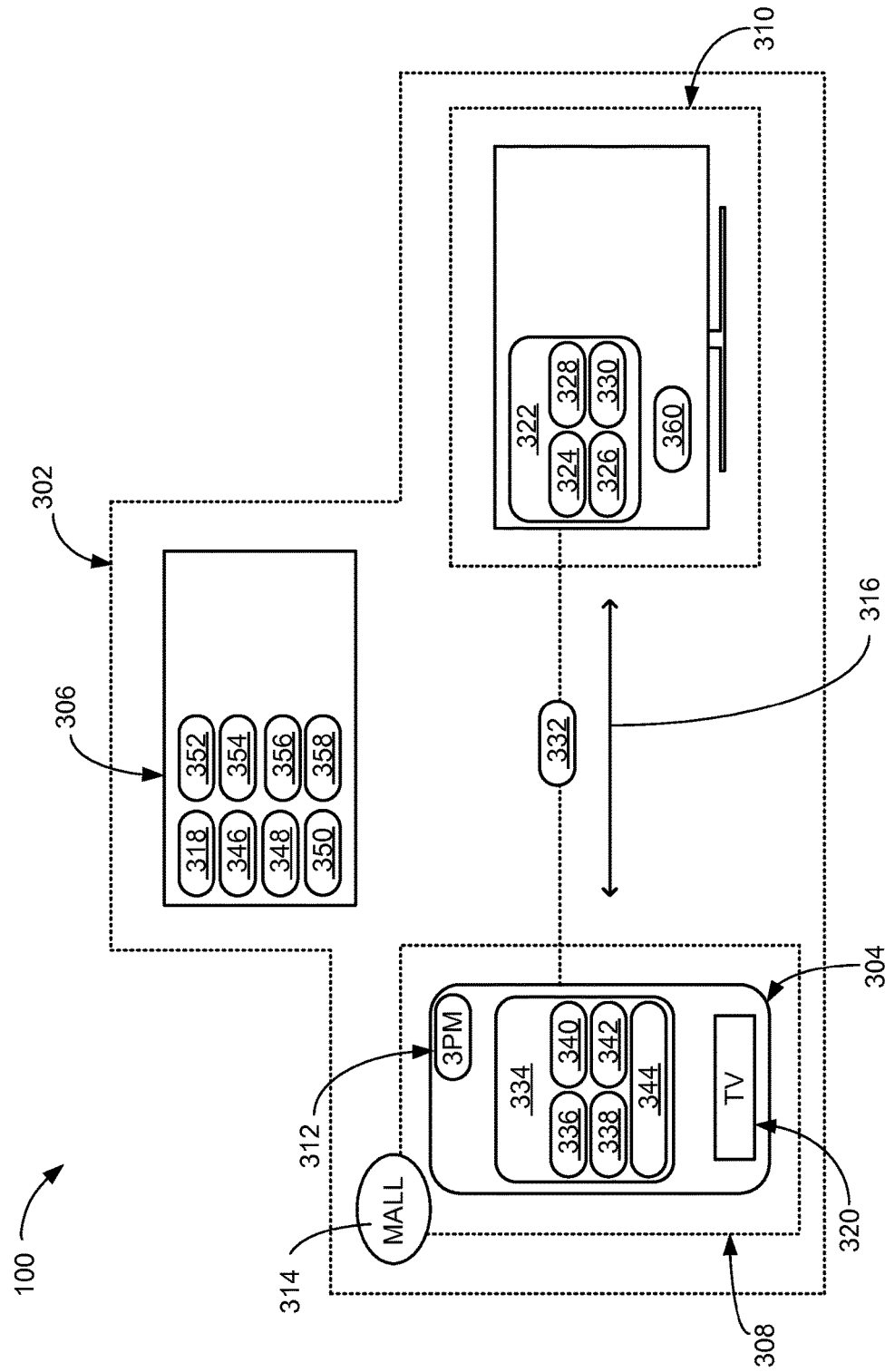
FIG. 3 is an example of search context.

Referring now to FIG. 3, therein is shown an example of a search context 302. The search context 302 is a situation or circumstance surrounding a client device 304, a server device 306, or a combination thereof. The client device 304 can represent the first device 102 of FIG. 1. The server device 306 can represent the second device 106 of FIG. 1.

The search context 302 can include an activity context 308, a display context 310, or a combination thereof. The activity context 308 is a situation or circumstance surrounding the client device 304, the server device 306, or a combination thereof for making the query 210 of FIG. 2. For example, the activity context 308 can represent a situation prior to the query 210 is made for the search 202 of FIG. 2. The display context 310 is a situation or circumstance surrounding the client device 304, the server device 306, or a combination thereof for displaying the search result 206.

The search context 302 can include a timeframe 312, a user location 314, a device proximity 316, or a combination thereof. The timeframe 312 is a time period. For example, the timeframe 312 can represent a time of day, week, month, year, season, or a combination thereof. The user location 314 can represent a physical location detected of the client device 304.

The device proximity 316 is a physical distance between one device and another device. For example, the device proximity 316 can represent the physical distance between one instance of the client device 304 and another instance of the client device 304. A proximity threshold 318 is a maximum distance between the devices. For example, the electronic system 100 can change the display format 232 of FIG. 2 if the device proximity 316 meets or exceeds the proximity threshold 318.

A user of the electronic system 100 can make an user designation 320 as part of the user entry 208 of FIG. 2. For example, the user designation 320 can indicate the destination type 234 of FIG. 2 for performing the search 202 of FIG. 2, displaying the search result 206 of FIG. 2, or a combination thereof.

The client device 304, the server device 306, or a combination thereof can include a device availability 322. The device availability 322 is an accessibility of a device. For example, if the client device 304 is busy or turned off, the device availability 322 can represent "unavailable." For further example, the device availability 322 can be based on a device activity 324, a device capacity 326, a device state 328, a device permission 330, or a combination thereof.

The device activity 324 is a function executed by a device. For example, the device activity 324 can represent the client device 304 currently performing the search 202 based on the query 210. The device capacity 326 is a capability of a device. For example, the device capacity 326 can represent a memory size of the client device 304. For another example, the device capacity 326 can represent an availability of the feature 236 of FIG. 2 to perform a specific instance of the function.

The device state 328 is a status of a device. For example, the device state 328 can represent a battery level of the client device 304. The device permission 330 is an authorization to access a device. For example, the device permission 330 can determine whether user has the permission to perform the search 202 on the client device 304. A network state 332 is a status of the communication path 104 of FIG. 1. For example, the network state 332 can indicate whether the communication path 104 is available for connecting to the server device 306 with the client device 304 via WiFi. For another example, the network state 332 can represent a connection speed of the communication path 104.

The application 240 of FIG. 2 can include an application availability 334. The application availability 334 is an accessibility of the application 240. For example, the application 240 can have the application availability 334 based on an application activity 336, an application capacity 338, an application relevancy 340, an application state 342, an application permission 344, or a combination thereof.

The application activity 336 is a function executed by the application 240. For example, the application activity 336 can represent the application 240 currently executing the search 202 based on the query 210. The application relevancy 340 is a suitability of the application 240 to the query 210. For example, the application 240 can be defined to perform the search 202 according to a category of interest. If the query 210 is for a movie show time, the application 240 for providing navigation can have the application relevancy 340 of "irrelevant." For further example, the application relevancy 340 can be represented in a range of levels. More specifically, the application relevancy 340 can be represented in alphanumeric values ranging from 0 to 10, A to F, or a combination thereof.

The application state 342 is a status of the application 240. For example, the application state 342 can represent whether the application 240 is "active" or "inactive." For a specific example, the application state 342 can represent "active" if the application 240 is performing the search 202. For a different example, the application state 342 can represent "active" if the application 240 is running in the background. The application permission 344 is an authorization to access the application 240. For example, the application permission 344 can determine whether user has the permission to perform the search 202 on the application 240.

A state threshold 346 is a minimum level. For example, the state threshold 346 can represent the minimum battery level required for the device state 328 to perform the search 202. For another example, the state threshold 346 can represent the minimum network connection speed required for the network state 332 in order for the client device 304 connects to the server device 306.

A task priority 348 is a precedence defined for one activity having over another activity. For example, the application 240 can have the activity of receiving the user entry 208 having a higher instance of the task priority 348 over another activity such as performing the search 202.

A search timing 350 is a sequential relation for performing a plurality of the search 202. For example, the search timing 350 can represent synchronous or parallel process for performing a plurality of the search 202 at the same time. For another example, the search timing 350 can represent a time delayed process where one instance of the search 202 can be performed before or after another instance of the search 202.

The electronic system 100 can track an activity history 352, which is a log of the activity performed on a device. For example, the activity history 352 can include when the user turned on or off the client device 304. The activity history 352 can include a search history 354, which is a log of the search 202 performed. For example, the electronic system 100 can track the search history 354 on the client device 304, the server device 306, the application 240 or a combination thereof.

A user profile 356 is user's personal information. For example, the user profile 356 can include the user's age, profession, sex, the user's interest 218 of FIG. 2, or a combination thereof. A weighting factor 358 is a priority placed on one element over another element. For example, the electronic system 100 can place a greater instance of the weighting factor 358 of the device capacity 326 over the weighting factor 358 of the device state 328. A future action 360 can represent the user's activity subsequent to the current activity being performed.

Figure 4:
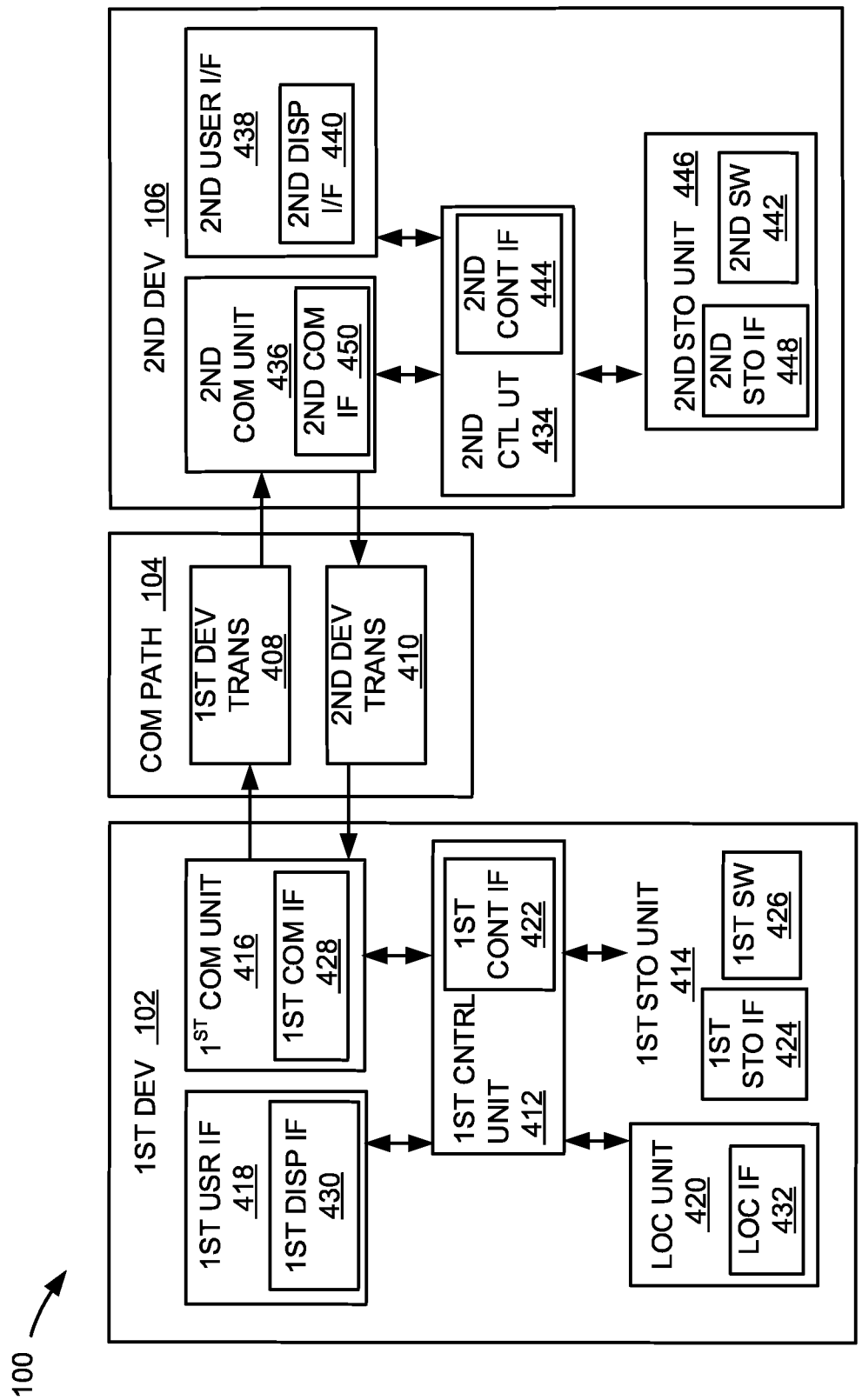
FIG. 4 is an exemplary block diagram of the electronic system.

Referring now to FIG. 4, therein is shown an exemplary block diagram of the electronic system 100. The electronic system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the electronic system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof. The relevant information can also include news, media, events, or a combination thereof from the third party content provider.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the electronic system 100. The first control unit 412 can also execute the first software 426 for the other functions of the electronic system 100, including receiving location information from the location unit 420. The first control unit 412 can further execute the first software 426 for interaction with the communication path 104 via the first communication unit 416.

The second device 106 can be optimized for implementing the embodiment of the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the electronic system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the electronic system 100, including operating the second communication unit 436 to communicate with the first device 102 over the communication path 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the electronic system 100 is shown with the second storage unit 446 as a single hierarchy storage system, although it is understood that the electronic system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The electronic system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 420, although it is understood that the second device 102 can also operate the location unit 420.

Figure 5:
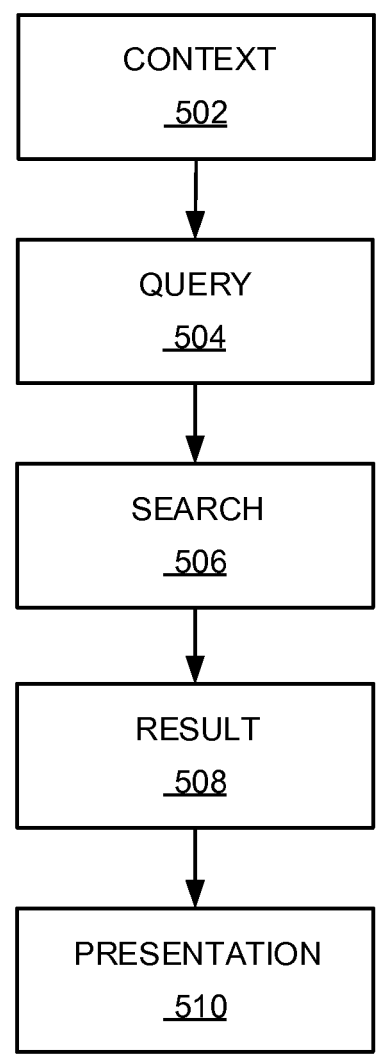
FIG. 5 is a control flow of the electronic system.

Referring now to FIG. 5, therein is shown a control flow of the electronic system 100 of FIG. 1. The electronic system 100 can include a context module 502. The context module 502 determines the search context 302 of FIG. 3. For example, the context module 502 can determine the search context 302 including the activity context 308 of FIG. 3, the display context 310 of FIG. 3, or a combination thereof.

A plurality of the server device 306 of FIG. 3, a plurality of the client device 304 of FIG. 3, or a combination thereof can each include the context module 502 to determine the search context 302 individually as discussed below. For example, one instance of the context module 502 in one instance of the client device 304 can determine the search context 302 different from the search context 302 determined by another instance of the context module 502 of another instance of the client device 304.

The context module 502 can determine the search context 302 in a number of ways. For example, the context module 502 can determine the search context 302 representing the activity context 308 based on the user location 314 of FIG. 3 where the user entry 208 of FIG. 2 was made on the client device 304. More specifically, the context module 502 can determine the user location 314 representing the current location where the user is operating the client device 304 based on the location unit 420 of FIG. 4.

For a specific example, the user location 314 can represent the shopping mall. The timeframe 312 of FIG. 3 can represent Sunday afternoon. Based on the user location 314 and the timeframe 312, the context module 502 can determine the activity context 308 to represent shopping on the weekend.

For further example, the user entry 208 can represent "MLB Giants." MLB can represent Major League Baseball. Giants can represent an American baseball team from San Francisco, Calif. in the United States. Continuing with the previous example, the context module 502 can determine the activity context 308 to represent that the user is shopping for Giants paraphernalia at the shopping mall.

For a different example, the context module 502 can determine the display context 310 based on the user location 314, the timeframe 312, the user entry 208, the client device 304, or a combination thereof. More specifically, as discussed above, the user location 314 can represent a shopping mall. Since the user is outside of the user's home, the user can only carry the client device 304 representing a smartphone. As a result, the context module 502 can determine the display context 310 to represent that the client device 304, a smartphone, as the destination 238 of FIG. 2 to display the search result 206 of FIG. 2.

In contrast, the user location 314 can represent the user's home. The context module 502 can determine the existence of other instances of the client device 304, such as TV, tablets, or a combination thereof via the location unit 420, the first communication unit 416 of FIG. 4, the communication path 104 of FIG. 1, or a combination thereof. As a result, the context module 502 can determine the display context 310 of displaying the search result 206 on more than one instance of client device 304. The context module 502 can communicate the search context 302 to a query module 504.

The electronic system 100 can include the query module 504, which can couple to the context module 502. The query module 504 generates the query 210 of FIG. 2. For example, the query module 504 can generate the query 210 based on the information 204 of FIG. 2 related to the user entry 208, the search context 302, or a combination thereof for searching in a plurality of the destination 238 different from one another.

A plurality of the server device 306, a plurality of the client device 304, or a combination thereof can each include the query module 504 to generate the query 210 individually as discussed below. For example, one instance of the query module 504 in one instance of the client device 304 can generates the query 210 different from the query 210 generated by another instance of the query module 504 of another instance of the client device 304.

The query module 504 can generate the query 210 in in a number of ways. For example, the query module 504 can generate the query 210 based on generating the substring 220 of FIG. 2. More specifically, the query module 504 can generate the query 210 by identifying the information 204 related to user entry 208, such as the substring 220, to the client device 304 for indicating what the user would like to search. For example, the query module 504 can identify the substring 220 using the string parsing algorithm.

The query module 504 can identify the substring 220 based on the activity context 308, the activity history 352 of FIG. 3, the user profile 356 of FIG. 3, or a combination thereof. For example, the activity context 308 can represent texting a message with short message service to a friend. As the user entry 208 is made to the client device 304, the query module 504 can generate the substring 220 for displaying on the first user interface 418 of FIG. 4.

More specifically, the activity history 352 of the user can indicate that the user was searching for a movie show time. Further, the activity history 352 can also indicate that the friend that the user is texting to can represent a friend who usually goes to the movie with the user. Additionally, the user profile 356 can indicate that the user is a movie buff.

The user can make the user entry 208 representing "How about a movie?" on the short message service. Based on the activity history 352, the user profile 356, or a combination thereof, the query module 504 can identify the substring 220 by highlighting the word "movie." More specifically, the query module 504 can identify the substring 220 representing the movie by hypertexting the word "movie." Furthermore, the query module 504 can generate the query 210 based on the substring 220 representing a hypertext word of "movie" to be selected by the user on the first user interface 418.

For further example, the query module 504 can generate the substring rank 222 of FIG. 2 based on the user entry 208, the substring 220, the activity context 308, the user profile 356, the activity history 352, or a combination thereof. More specifically, the user entry 208 can represent a text. Moreover, not all the text made as the user entry 208 can be relevant to the query 210. The query module 504 can generate the substring rank 222 based on ranking the substring 220 identified according to the activity context 308, the activity history 352, the user profile 356, or a combination thereof.

Continuing with the previous example, the query module 504 can identify the substring 220 related to "movie" as discussed above. The activity context 308 can represent the timeframe 312 of Thursday with the user and the friend planning for Friday movie night by texting with short message service. The user profile 356 can indicate that the user enjoys Science Fiction movies. Furthermore, the activity history 352 can indicate that the user had shared her likes for the movie genre for Science Fiction while dislikes for Sports movies.

Based on the activity context 308, the user profile 356, the activity history 352, or a combination thereof, the query module 504 can generate the substring rank 222 by ranking the instance of the substring 220 related to "movie" higher than other instance of the substring 220 unrelated to "movie." For further example, the query module 504 can generate the substring rank 222 by ranking the instance of the substring 220 related to movie genre of Science Fiction higher than other movie genre such as Sports.

For further example, the query module 504 can generate the query 210 including the query type 212 of FIG. 2. The query type 212 can include the main query 214 of FIG. 2, the related query 216 of FIG. 2, or a combination thereof. The query module 504 can generate the main query 214, the related query 216, or a combination thereof based on the substring rank 222.

More specifically, as discussed above, the substring rank 222 can rank a plurality of the substring 220 in the user entry 208. The plurality of the substring 220 can be related to each other as each instances of the substring 220 are part of the user entry 208. However, based on various factors discussed above, not all of the substring 220 can be determined as the main query 214. As a result, the query module 504 can generate the main query 214 based on the substring 220 with the highest rank of the substring rank 222 and other instances of the substring 220 with lower ranking to be generated as the related query 216.

It has been discovered that the electronic system 100 generating the main query 214, the related query 216, or a combination thereof can improve a performance of the search 202 of FIG. 2. By filtering a plurality of the substring 220 according to the substring rank 222, the electronic system 100 can determine the substring 220 most relevant to the user. As a result, the electronic system 100 can improve the generation of the main query 214, the related query 216, or a combination thereof according to a plurality of the substring 220 being ranked for improved performance of the search 202.

For another example, the query module 504 can generate the substring candidate 224 of FIG. 2 based on the user entry 208, the substring 220, the activity context 308, the user profile 356, the activity history 352, or a combination thereof. Continuing with the previous example, the activity context 308 can represent shopping at a shopping mall. The user can make the user entry 208 on the first user interface 418. The user profile 356 can indicate that the user is a sports fanatic who frequents to MLB games and Major League Soccer (MSL) games.

For example, as the user enters the user entry 208 representing "ML," the query module 504 can generate the substring candidate 224 based on the user entry 208, the activity context 308, the user profile 356, or a combination thereof for displaying on the first user interface 418. More specifically, the query module 504 can generate the substring candidate 224 by highlighting the potential next alphabet letter relevant to the user entry 208. For a specific example, the query module 504 can generate the substring candidate 224 representing "S," "B," or a combination thereof to follow the user entry 208 of "ML" to form the query 210 including "MLB," "MLS," or a combination thereof.

For another example, the query module 504 can generate the term correction 228 of FIG. 2 specific to the destination 238 based on the destination dictionary 230 of FIG. 2. More specifically, the query module 504 can generate the term correction 228 by comparing the user entry 208 to the destination dictionary 230 specific to the destination 238. For example, the substring 220 from the user entry 208 can be compared to a plurality of a term available in the destination dictionary 230.

The destination dictionary 230 can be from the destination 238 representing the application 240 of FIG. 2, the client device 304, or a combination thereof. For a specific example, the destination 238 can represent the application 240. The application 240 can represent a search engine software with the destination dictionary 230. The query module 504 can generate the term correction 228 by correcting the substring 220 based on the term in the destination dictionary 230 using a string comparison algorithm. As a result, the query module 504 can generate the query 210 by replacing the user entry 208 with the term correction 228 tailored for searching in the destination 238.

For a different example, the query module 504 can generate the term correction 228 based on the task priority 348 of FIG. 3. More specifically, the destination 238 can include the task priority 348 to prioritize the functions performed by the destination 238. As a result, if the destination 238 is currently busy with performing a certain function having the task priority 348 higher than of generating the term correction 228, the electronic system 100 can delay, halt, or a combination thereof the generation of the term correction 228.

For another example, the query module 504 can generate the suggestion 226 of FIG. 2 based on the user entry 208, the previous search result 206 of FIG. 2, the activity history 352, the activity context 308, the task priority 348, or a combination thereof. As an example, the query module 504 can generate the suggestion 226 based on the previous search result 206. More specifically, the activity history 352 can indicate that the user had selected the previous search result 206 generated by a plurality of the destination 238 in response to the query 210 made previously in the given instance of the activity context 308. The query module 504 can generate the suggestion 226 based on the previous search result 206 for similar instance of the activity context 308.

For further example, the query module 504 can generate the suggestion 226 based on the activity history 352 representing an interaction with the destination type 234 of FIG. 2. For example, one instance of the destination 238 can represent the application 240 for MLB while another instance of the destination 238 can represent the application 240 for a shopping website, such as Amazon™. The activity history 352 can indicate that the user had searched for game tickets for the destination 238 representing MLB app while the user had searched for team paraphernalia for the destination 238 representing the shopping app. As a result, the query module 504 can generate a plurality of the suggestion 226 suited for the destination type 234 based on the activity history 352. More specifically, the query module 504 can generate the suggestion 226 for "game ticket" for MLB app while generating the suggestion 226 for "team t-shirt" for the shopping app.

It has been discovered that the electronic system 100 generating the suggestion 226 based on the activity history 352, the destination type 234, or a combination thereof can improve the performance of the search 202. By tailoring the suggestion 226 according to the destination type 234, the electronic system 100 can improve the performance of the search 202 to obtain the search result 206 of FIG. 2 most relevant to the user for enhanced user experience of the first device 102, the electronic system 100, or a combination thereof.

For a different example, the query module 504 can generate the suggestion 226 representing a prefix based on the activity history 352, the activity context 308, the user entry 208, or a combination thereof. More specifically, when the user enter the user entry 208 on the first user interface 418, the query module 504 can generate a plurality of the suggestion 226 representing a plurality of prefix that the electronic system 100 can form from the user entry 208.

As an example, the user profile 356 can indicate the user's interest 218 of FIG. 2 in sports. The activity history 352 can indicate that the user supports professional sports team in the Bay Area of California. As the user enters the user entry 208, the query module 504 can generate a plurality of the suggestion 226 including a prefix, the previous search result 206, the query 210 previously used, or a combination thereof presented on the first user interface 418. For a specific example, if the user entry 208 represents "ML," the query module 504 can generate the suggestion 226 including "MLB," "MLS," "Giants," "Athletics," "Earthquakes," or a combination thereof.

The query module 504 can generate the query 210 based on the substring 220, the term correction 228, the suggestion 226, the device capacity 326 of FIG. 3, the application capacity 338 of FIG. 3, or a combination thereof. For example, the query module 504 can generate the query 210 based on the application capacity 338. More specifically, the application capacity 338 of one instance of the destination 238 representing the application 240 can include a review for point of interest but does not include a navigation guidance functionality to the point of interest. The query module 504 can generate the query 210 to search for reviews regarding the point of interest but not include a term that would request a navigation guidance to the point of interest.

Continuing with the examples above, the query module 504 can generate the query 210 based on the substring 220 identified from the user entry 208, the term correction 228 generated from the user entry 208, the suggestion 226 relevant to the user's interest 218, or a combination thereof. The query module 504 can communicate the query 210 to a search module 506.

The electronic system 100 can include the search module 506, coupled to the query module 504. The search module 506 performs the search 202. For example, the search module 506 can perform a plurality of the search 202 within a plurality of the destination 238 based on the query 210 for generating a plurality of the search result 206.

The search module 506 can perform the search 202 in a number of ways. For example, the search module 506 can perform a plurality of the search 202 across a plurality of the client device 304, a plurality of the server device 306, or a combination thereof. More specifically, a plurality of the client device 304, a plurality of the server device 306, or a combination thereof can share the search history 354 of FIG. 3 of the search 202 performed on each devices at a given instance of the timeframe 312.

For a specific example, the search module 506 can perform the search 202 for the query 210 on the destination type 234 representing the server device 306, the client device 304, or a combination thereof. More specifically, the search module 506 can perform the search 202 based on the device availability 322 of FIG. 3, the device activity 324 of FIG. 3, or a combination thereof across a plurality of the client device 304, a plurality of the server device 306, or a combination thereof. The device availability 322 can depend on the device capacity 326, the device state 328 of FIG. 3, the device permission 330 of FIG. 3, the network state 332 of FIG. 3, the user designation 320 of FIG. 3, the weighting factor 358 of FIG. 3, or a combination thereof.

For a specific example, the search module 506 can perform the search 202 based on the device capacity 326 of the client device 304. More specifically, the device capacity 326 can be limited by the first storage unit 414 of FIG. 4. For example, if the client device 304 is performing the device activity 324, thus maximizing the device capacity 326 to perform the search 202 and unavailable to perform any other function, the search module 506 can determine that the device availability 322 for the client device 304 to be "unavailable."

For further example, the device capacity 326 can represent the ability of the client device 304 to perform the search 202 on the client device 304. If the client device 304 does not have the device capacity 326 or the functionality to perform the search 202, the search module 506 can determine the device availability 322 of the client device 304 to be "unavailable." As a result, the search module 506 can perform the search 202 on the other instances of the client device 304 with the device availability 322 of "available."

For another example, the search module 506 can perform the search 202 based on the device state 328 of the client device 304. More specifically, the device state 328 can represent the battery level of the client device 304. For example, if the device state 328 is below the state threshold 346 of FIG. 3 of 4% battery level, the search module 506 can determine the device availability 322 of "unavailable." As a result, the search module 506 can perform the search 202 on the other instances of the client device 304 with the device availability 322 of "available" based on the device state 328 meeting or exceeding the state threshold 346.

For another example, the search module 506 can perform the search 202 based on the device permission 330 to the client device 304. More specifically, a user of the electronic system 100 may not have the device permission 330 to perform the search 202. For example, if the user does not have the device permission 330 to perform the search 202 on a particular instance of the client device 304, the search module 506 can determine the device availability 322 for the one particular instance of the client device 304 to represent "unavailable." As a result, the search module 506 can perform the search 202 on other instances of the client device 304 where the user has the device permission 330.

For another example, the search module 506 can perform the search 202 based on the network state 332 of the communication path 104 of FIG. 1. More specifically, if the network state 332 to a particular instance of the client device 304 is unconnected, the search module 506 can determine the device availability 322 of "unavailable" for the particular instance of the client device 304. As a result, the search module 506 can perform the search 202 on other instances of the client device 304 where the client device 304 has the network state 332 of connected.

For a different example, the search module 506 can perform the search 202 based on the device activity 324 of the client device 304. For example, an instance of the client device 304 representing a TV can be displaying a video on the first user interface 418. If the task priority 348 of displaying a video is higher than performing the search 202 on TV, the search module 506 can look for another instance of the client device 304 to perform the search 202. More specifically, the search module 506 can perform the search 202 on the client device 304 where the search 202 has a higher instance of the task priority 348 than other instances of the device activity 324.

For further example, receiving the user entry 208 on the client device 304 can have a higher instance of the task priority 348 than performing the search 202 on the client device 304. The search module 506 can halt the search 202 and accept the user entry 208. For a different example, generating the search result 206 can have a higher instance of the task priority 348 than performing the search 202 on the client device 304. The search module 506 can halt the search 202 and generate the search result 206.

For another example, the search module 506 can perform the search 202 based on the user designation 320. More specifically, the user designation 320 can indicate that the user would like the search 202 to be performed on the client device 304 representing a TV instead of the client device representing a tablet. Based on the user designation 320, the search module 506 can perform the search 202 on the TV instead of the tablet.

For additional example, the search module 506 can perform the search 202 based on the weighting factor 358. Based on the weighting factor 358, the search module 506 can select where to perform the search 202. For example, the weighting factor 358 of the device capacity 326 can be greater than the weighting factor 358 of the device state 328. More specifically, one instance of the client device 304 can have the device state 328 of full battery while another instance of the client device 304 can have the device state 328 of 25% battery level. However, the client device 304 with the 25% battery level can have the greater instance of the device capacity 326 than the client device 304 with fully battery. As a result, the search module 506 can perform the search 202 on the client device 304 with the greater instance of the device capacity 326 than greater instance of the device state 328 based on the weighting factor 358.

For a different example, the search module 506 can perform the search 202 for the query 210 on the destination type 234 representing the application 240. More specifically, the search module 506 can perform the search 202 based on the application availability 334 of FIG. 3, the application activity 336 of FIG. 3, or a combination thereof for the application 240 currently executed on the client device 304, the server device 306, or a combination thereof.

The search module 506 can perform a plurality of the search 202 across a plurality of the application 240 running on the client device 304, the server device 306, or a combination thereof. More specifically, the search module 506 can perform the search 202 based on the application activity 336. The application activity 336 can include the search history 354, the activity context 308, the task priority 348, or a combination thereof.

For a specific example, the search module 506 can perform the search 202 based on the search history 354. More specifically, a plurality of the application 240 can share the search history 354 of the search 202 performed on each instances of the application 240 running on the client device 304, the server device 306, or a combination thereof.

For another example, the search module 506 can perform the search 202 based on the activity context 308. More specifically, a plurality of the application 240 can share the activity context 308 of when, where, how, or a combination thereof the search 202 was performed on each instances of the application 240 running on the client device 304, the server device 306, or a combination thereof.

For another example, the search module 506 can perform the search 202 based on the task priority 348. More specifically, the task priority 348 can give a priority of one functionality performed by one instance of the application 240 over another functionality performed by another instance of the application 240. For further example, the task priority 348 can give a priority of one functionality performed by the application 240 over another functionality performed by the same instance of the application 240.

For a specific example, the task priority 348 can indicate that displaying the search result 206 on the application 240 can have a higher priority than performing the search 202 on the application 240. Based on the task priority 348, the search module 506 can halt the search 202 performed on the application 240 while the application 240 is displaying the search result 206. For further example, the task priority 348 can indicate that receiving the user entry 208 on the application 240 can have a higher priority than performing the search 202 on the application 240. Based on the task priority 348, the search module 506 can halt the search 202 performed on the application 240 while the application 240 receives the user entry 208.

For a different example, the search module 506 can perform the search 202 based on the application availability 334. The application availability 334 can include the application capacity 338, the application relevancy 340 of FIG. 3, the application state 342 of FIG. 3, the application permission 344 of FIG. 3, the user designation 320, or a combination thereof.

For a specific example, the search module 506 can perform the search 202 based on the application capacity 338. More specifically, the application capacity 338 can represent the ability to perform the search 202 on the application 240. If the application 240 does not have the application capacity 338 to perform the search 202, the search module 506 can determine the application availability 334 of the application 240 to be "unavailable."

For further example, the activity context 308 can limit the application capacity 338 of the application 240. More specifically, the activity context 308 can represent that the user is wine tasting in Napa, Calif. The search module 506 can limit the application capacity 338 based on the activity context 308 to limit the search 202 for California wine instead of French wine. Furthermore, the search module 506 can share the application capacity 338 under the activity context 308 to other instances of the application 240 running on the client device 304, the server device 306, or a combination thereof.

For another example, the search module 506 can perform the search 202 based on the application relevancy 340. More specifically, the search module 506 can perform the search 202 on one instance of the application 240 with the application relevancy 340 of "relevant" while not perform the search 202 on another instance the application 240 with the application relevancy 340 of "irrelevant."

For a specific example, the query 210 can represent "movie show time." The application 240 for navigation guidance can be set with the application relevancy 340 of "irrelevant" while another instance of the application 240 representing a search engine can be set with the application relevancy 340 of "relevant" for the query 210 related to "movie." As a result, the search module 506 can perform the search 202 on the search engine for movie time but not on the application 240 for navigation guidance.

For further example, the search module 506 can determine the application relevancy 340 based on the search history 354. The search history 354 can indicate that the user had never performed the search 202 on the application 240 representing a navigation guidance for the query 210 representing "movie show time." As a result, the search module 506 can perform the search 202 on other instances of the application 240 which had the search history 354 for movie time but not on the application 240 for navigation guidance.

For further example, the search module 506 can determine the application relevancy 340 based on the query 210, the activity context 308, or a combination thereof. The query 210 can represent search for a movie called "Die Hard." The activity context 308 can represent the user shopping at a shopping mall. Based on the query 210, the activity context 308, the search module 506 can determine the application relevancy 340 for the application 240 representing navigation app as "irrelevant." The application relevancy 340 can be represented with a numeric value of "0" if the application relevancy 340 was determined as "irrelevant."

In contrast, the activity context 308 can represent the user touring around Hollywood and Beverly Hills. Bruce Willis, the actor for "Die Hard" can live in the vicinity. The query 210 can represent "Die Hard." Based on the query 210, the activity context 308, the search module 506 can determine the application relevancy 340 for the application 240 representing navigation app as "relevant." The application relevancy 340 can be represented with a numeric value of "7" if the application relevancy 340 was determined as "relevant."

For another example, the search module 506 can perform the search 202 based on the application permission 344. Similarly as discussed above, the search module 506 can perform the search 202 on the application 240 that the user has the application permission 344. If the user does not have the application permission 344 to the application 240, the search module 506 can perform the search 202 on other instances of the application 240 that the user has the application permission 344.

For another example, the search module 506 can perform the search 202 based on the user designation 320. More specifically, the user can designate the application 240 that the user would like the application 240 to perform the search 202 for the query 210. The user can make the user designation 320 by selection the application 240 with the user entry 208.

For another example, the search module 506 can perform the search 202 based on activating the application 240 with the application state 342 of "inactive." As an example, based on the user designation 320 as discussed above, the search module 506 can activate the application 240 with the application state 342 of "inactive" to "active." For a different example, based on the activity context 308, the search module 506 can activate the application 240 with the application state 342 of "inactive" to "active" because the application 240 is suited for the activity context 308.

For a specific example, the activity context 308 can be the user driving a vehicle. Prior to driving the vehicle, the activity context 308 can represent the user watching a movie at a theater. The application state 342 for the application 240 representing a navigation guidance can be "inactive." When the user started to drive the vehicle, the search module 506 can activate the application 240 for the navigation guidance to perform the search 202.

For further example, the search module 506 can activate or deactivate the application 240 based on the application capacity 338. As discussed above, some instance of the application 240 may not have the application capacity 338 to perform the search 202. The application state 342 can still have the application state 342 of "active." Based on the application capacity 338, the search module 506 can change the application state 342 to "inactive" by deactivating the application 240.

The search module 506 can perform the search 202 according to the search timing 350 of FIG. 3. For example, the search module 506 can perform the search 202 based on the search timing 350 representing simultaneous or parallel instance of a plurality of the search 202. More specifically, the search module 506 can perform a plurality of the search 202 simultaneously or in parallel across a plurality of the application 240 running on the client device 304, the server device 306, or a combination thereof. For further example, the search module 506 can perform a plurality of the search 202 simultaneously or in parallel across a plurality of the client device 304, a plurality of the server device 306, or a combination thereof.

For a different example, the search module 506 can perform the search 202 according to the search timing 350 representing time delayed. More specifically, the search module 506 can perform a plurality of the search 202 having one instance of the search 202 performed before or after another instance of the search 202. For further example, the search module 506 can perform a plurality of the search 202 having one instance of the search 202 performed on one instance of the application 240 before the search 202 performed on another instance of the application 240. For additional example, the search module 506 can perform a plurality of the search 202 having one instance of the search 202 performed on one instance of the client device 304 before the search 202 performed on another instance of the client device 304.

The search module 506 can perform the search 202 according to the search timing 350 based on the user designation 320, the activity context 308, the search history 354, or a combination thereof. For example, the search module 506 can perform the search 202 according to the search timing 350 instructed by the user designation 320 to search simultaneously or staggered. More specifically, the user designation 320 can designate the timeframe 312 to perform the search 202 for one instance of the application 240 and the timeframe 312 to perform the search 202 for another instance of the application 240 running on the same instance of the client device 304.

For further example, the search module 506 can perform the search 202 prior to the user entry 208 is made or completed. More specifically, the search module 506 can perform the search 202 based on the activity context 308 to initiate the search 202. For example, the search module 506 can perform the search 202 for movie show time if the activity context 308 indicates that the user is in the vicinity of a movie theater.

For further example, the search module 506 can perform the search 202 according to the search timing 350 based on the activity context 308. More specifically, the activity context 308 can represent the user searching for a place to watch a football match. Based on the activity context 308, the search module 506 can perform the search 202 on the application 240 representing a bar review site, the application 240 representing a navigation guidance to reach the bar, the application 240 representing a search engine, or a combination thereof before performing the search 202 for the application 240 representing a shopping site for searching for the paraphernalia for the team playing in the match. The search module 506 can communicate the search 202 to a result module 508.

It has been discovered that the electronic system 100 performing the search 202 based on the search timing 350 improves the usage of obtaining the search result 206. By changing the search timing 350 according to the activity context 308, the electronic system 100 can stagger a plurality of the search 202 to obtain the search result 206. As a result, the electronic system 100 can improve the user experience from the improved usage for operating the first device 102, the electronic system 100, or a combination thereof.

The electronic system 100 can include the result module 508, which can couple to the search module 506. The result module 508 generates the search result 206. For example, the result module 508 can generate a plurality of the search result 206 based on the search 202 performed on each instances of the application 240, the client device 304, the server device 306, or a combination thereof.

The result module 508 can generate the search result 206 in a number of ways. As discussed above, the result module 508 can generate the search result 206 for each instances of the destination type 234. For example, the result module 508 can generate the search result 206 based on the search 202 performed on the destination type 234 representing the application 240, the client device 304, the server device 306, or a combination thereof.

For a specific example, the result module 508 can generate the search result 206 based on the activity context 308. More specifically, the activity context 308 can represent the user driving a vehicle. The result module 508 can generate the search result 206 until the activity context 308 is determined that the user no longer driving to improve safety of the user. In contrast, the result module 508 can generate the search result 206 for the application 240 representing a navigation guidance but not for other instances of the application 240 unrelated to the navigation based on the activity context 308. The result module 508 can communicate the search result 206 to a presentation module 510.

The electronic system 100 can include the presentation module 510, which can couple to the result module 508. The presentation module 510 presents the search result 206. For example, the presentation module 510 can present a plurality of the search result in the display format 232 of FIG. 2 native to each instances of the destination 238 within which a plurality of the search 202 were performed, the plurality of the search result 206 displayed in a plurality of the display format tailored to the feature 236 of FIG. 2 controlled by and specific to each instances of a plurality of the destination 238. For further example, the presentation module 508 can present a plurality of the search result 206 of a plurality of the destination 238 based on a plurality of the search 202 where one instance of the search result 206 is different from another instance of the search result 206.

The presentation module 510 can present the search result 206 in a number of ways. The presentation module 510 can present the search result 206 based on the display context 310. For example, the display context 310 can include the device capacity 326, the device proximity 316 of FIG. 3, the device state 328, or a combination thereof. More specifically, the device capacity 326 can include the feature 236 controlled by the destination 238.

For example, the following can represent examples of the presentation module 510 presenting the search result 206 in the display format 232 native to the destination 238 according to the feature 236 controlled by the destination 238. The feature 236 can include the ability of the destination 238 to display a plurality of the search result 206 in the display format 232 of the slideshow 246 when the user is not actively interacting with the client device 304. More specifically, the presentation module 510 can display each instance of the plurality of the search result 206 in each instance of the slide 248 amongst multiple instances of the slide 248 of the slideshow 246.

It has been discovered that the electronic system 100 presenting a plurality of the search result 206 in the display format 232 representing the slideshow 246 can improve the efficiency of delivering a plurality of the search result 206 from a plurality of the destination 238. By presenting each instance of the plurality of the search result 206 in each instance of the slide 248 of the slideshow 246, the presentation module 510 can improve the organization and information provided in the search result 206. As a result, the electronic system 100 can improve the user experience for operating the electronic system 100, the first device 102, or a combination thereof.

The feature 236 can also include the ability of the destination 238 to display the search result 206 in the display format 232 in rich media, static media, or a combination thereof. The feature 236 can also include the ability of the destination 238 to display the search result 206 in the display format 232 of two or three dimensional display. The feature 236 can also include the ability of the destination 238 to display the search result 206 in the display format 232 by projecting the search result 206 on a surface other than the client device 304 or the server device 306 that generated the search result 206.

For a different example, the presentation module 510 can present the search result 206 based on the query type 212. For example, the query type 212 can include the main query 214, the related query 216, or a combination thereof. The presentation module 510 can determine the destination 238 based on the query type 212 for displaying the search result 206. For further example, the presentation module 510 can determine the destination 238 based on the user designation 320 to display the search result 206.

More specifically, the user designation 320 can indicate for the presentation module 510 to present the search result 206 based on the main query 214 on the client device 304 representing the user's smartphone. The user designation 320 can indicate for the presentation module 510 to present the search result 206 based on the related query 216 on other instances of the client device 304, such as TV, tablet, or a combination thereof.

For further example, the presentation module 510 can present the search result 206 based on the query type 212, the display context 310, or a combination thereof. If the display context 310 indicates that the user is at home, the presentation module 510 can present the search result 206 from the main query 214 on the client device 304 with the first user interface 418 having a bigger dimension, such as a TV. The presentation module 510 can present the search result 206 from the related query 216 on the client device 304 with the first user interface 418 having a smaller dimension, such as a smartphone. In contrast, if the display context 310 represents that the user is outside of his home, the presentation module 510 can present the search result 206 from the main query 214 only on the client device 304 representing a smartphone and not display the search result 206 from the related query 216.

It has been discovered that the electronic system 100 presenting the search result 206 based on the query type 212 can improve the efficiency of presenting the 206. By changing the presentation of the search result 206 based on the query type 212, the electronic system 100 can select the device most optimal for the user to view the search result 206. As a result, the electronic system 100 can improve the presentation of the search result 206 for enhanced user experience operating the first device 102, the electronic system 100, or a combination thereof.

For another example, the presentation module 510 can present the search result 206 based on the display context 310 including the device proximity 316. More specifically, the device proximity 316 can represent a physical distance between one instance of the client device 304 and another instance of the client device 304. For a specific example, one instance of the client device 304 can represent a smartphone. Another instance of the client device 304 can represent a TV.

The display context 310 can represent that the user is at home with his TV available to display the search result 206 along with the user's smartphone. The presentation module 510 can change the display format 232 based on the changes in the device proximity 316. More specifically, if the device proximity 316 between the smartphone and the TV are within the proximity threshold 318 of FIG. 3, the presentation module 510 can display the search result 206 as a text list on the TV, the smartphone, or a combination thereof.

In contrast, if the device proximity 316 between the TV and the smartphone meets or exceeds the proximity threshold 318, the presentation module 510 can change the display format 232 by increasing the font size of the text for the search result 206, displaying an image instead of text for the search result 206, decreasing a number of categories for the search result 206 displayed, or a combination thereof.

Additionally, the result ranking 244 of FIG. 2 of the search result 206 can change based on the difference between the device proximity 316 and the proximity threshold 318. More specifically, if the device proximity 316 is below the proximity threshold 318, the presentation module 510 can display the result ranking 244 in its entirety. In contrast, if the device proximity 316 meets or exceeds the proximity threshold 318, the presentation module 510 can display just the top 3 of the result ranking 244, for example.

It has been discovered that the electronic system 100 presenting the search result 206 based on the device proximity 316 and the proximity threshold 318 can improve the display of presenting the search result 206. By detecting whether the device proximity 316 met or exceeded the proximity threshold 318, the electronic system 100 can change the display format 232, the destination 238, or a combination thereof for presenting the search result 206. As a result, the electronic system 100 can enhanced the user experience for operating the first device 102, the electronic system 100, or a combination thereof.

For another example, the presentation module 510 can present the search result 206 based on the device state 328. More specifically, the presentation module 510 can present the search result 206 if the device state 328 is "available."

For further example, the presentation module 510 can present the search result 206 based on if the device state 328 represents "currently used" or "idle." More specifically, if the device state 328 is currently used, the presentation module 510 can present the search result 206 on the client device 304 with the device state 328 of idle to maximize the client device 304 available.

For another example, the presentation module 510 can present the search result 206 based on the future action 360 of FIG. 3, the activity context 308, or a combination thereof. More specifically, the activity context 308 can represent the user of the electronic system 100 is going out for a dinner and a movie. While the user is having dinner, the search 202 for finding out the direction for the future action 360 representing driving to the movie theater can be performed. However, the activity context 308 has not changed to driving to the movie theater. As a result, the presentation module 510 can store the search result 206 in the first storage unit 414 to be presented when the activity context 308 is changed to navigating to the movie theater.

For a different example, the presentation module 510 can present the search result 206 based on the application capacity 338. More specifically, the application capacity 338 can represent the ability to perform the search 202 and display the search result 206. The presentation module 510 can present the search result 206 if the application 240 includes the application capacity 338 to present the search result 206.

For another example, the presentation module 510 can present the search result 206 based on the display format 232, the display pane 242 of FIG. 2, or a combination thereof. More specifically, the application 240 can include a plurality of the display pane 242 arranged according the to the display format 232. One instance of the search 202 can be performed on one instance of the display pane 242 while another instance of the search 202 can be performed on another instance of the display pane 242. The presentation module 510 can present each instances of the search result 206 on each instances of the display pane 242. More specifically, a plurality of the search result 206 can be displayed according to an arrangement laid out by the display format 232.

It has been discovered that the electronic system 100 presenting a plurality of the search result 206 displayed according to the display format 232 native to the application 240 can improve the layout of the presentation of the search result 206. By maintaining the independent instance of the display format 232, the electronic system 100 can avoid aggregating a plurality of the search result 206 into one instance of the display format 232. As a result, the electronic system 100 can maintain the display format 232 for the destination 238 for presenting the search result 206 for enhanced user experience of operating the first device 102, the electronic system 100, or a combination thereof.

For another example, the presentation module 510 can present a plurality of the search result 206 from the search 202 performed on the application 240 based on the query type 212, the activity context 308, or a combination thereof. As discussed above for a plurality of the client device 304 presenting the search result 206 based on the query type 212, a plurality of the application 240 can present the search result 206 based on the query type 212.

For example, the activity context 308 can represent looking for Halloween costumes. Based on the activity context 308, the main query 214 can represent "Halloween costumes," the related query 216 can represent "Halloween" and "costumes," or a combination thereof. For further example, based on the activity context 308, the application 240 representing a shopping app can perform the search 202 for the main query 214 while other instances of the application 240, such as the Calendar app and the Movie app, can perform the search 202 for the related query 216.

As discussed above, the presentation module 510 can present the search result 206 in the display format 232 native to the destination type 234. For example, one instance of the query 210 can lead to multiple instances of the search 202 being performed on various instances of the destination 238. More specifically, a plurality of the application 240 that performed the search 202 can display each instance of the search result 206 in the display format 232 native to each instance of the application 240. The display format 232 native to the application 240 can represent, for example, the presentation module 510 displaying the search result 206 according to the layout of the application 240. Moreover, the presentation module 510 can present the search result 206 according to the feature 236 controlled by the application 240.

For a different example, the presentation module 510 can present a plurality of the search result 206 into one instance of the display format 232. More specifically, one instance of the application 240 receiving the query 210 can trigger the search 202 to be performed on a plurality of other instances of the application 240. Each instances of the application 240 can generate the search result 206 to be displayed according to the display format 232 of the application 240 that triggered the search 202. For further example, the presentation module 510 can present a plurality of the search result 206 based on a plurality of the search 202 triggered by a plurality of the user entry 208 from multiple users, a single user, or a combination thereof. For another example, the presentation module 510 can present a plurality of the search result 206 individually on each instances of the destination 238 as a separate operation to present the search result 206 for each instances of the query 210 requested by multiple users.

For a specific example, the user can enter the query 210 representing "Van Halen" on the destination 238 representing the first device 102 owned by the user. Another instance of the first device 102 operated by the user's friend can have the music for "Van Halen." The presenter module 510 can present the search result 206 of the query 210 on the destination 238 owned by the user's friend. Furthermore, the presentation module 510 can present the search result 206 by playing the music for "Van Halen" on the first device 102 of the user's friend.

For another example, the query 210 can be entered for searching a restaurant for lunch on the first device 102 operated by the user's friend. The presentation module 510 can present the search result 206 for the query 210 on the destination 238 representing the application 240 for restaurant recommendation on the first device 102 operated by the user.

The physical transformation from changing the activity context 308 based on changing the user location 314 results in the movement in the physical world, such as people using the first device 102, based on the operation of the electronic system 100. As the movement in the physical world occurs, the movement itself creates additional information that is converted back into determining the search context 302, generating the query 210, performing the search 202, presenting the search result 206, or a combination thereof for the continued operation of the electronic system 100 and to continue movement in the physical world.

The first software 426 of FIG. 4 of the first device 102 of FIG. 4 can include the electronic system 100. For example, the first software 426 can include the context module 502, the query module 504, the search module 506, the result module 508, and the presentation module 510.

The first control unit 412 of FIG. 4 can execute the first software 426 for the context module 502 to determine the search context 302. The first control unit 412 can execute the first software 426 for the query module 504 to generate the query 210.

The first control unit 412 can execute the first software 426 for the search module 506 to perform the search 202. The first control unit 412 can execute the first software 426 for the result module 508 to generate the search result 206. The first control unit 412 can execute the first software 426 for the presentation module 510 to present the search result 206.

The second software 442 of FIG. 4 of the second device 106 of FIG. 4 can include the electronic system 100. For example, the second software 442 can include the context module 502, the query module 504, the search module 506, the result module 508, and the presentation module 510.

The second control unit 434 of FIG. 4 can execute the second software 442 for the context module 502 to determine the search context 302. The second control unit 434 can execute the second software 442 for the query module 504 to generate the query 210.

The second control unit 434 can execute the second software 442 for the search module 506 to perform the search 202. The second control unit 434 can execute the second software 442 for the result module 508 to generate the search result 206. The second control unit 434 can execute the second software 442 for the presentation module 510 to present the search result 206.

The electronic system 100 can be partitioned between the first software 426 and the second software 442. For example, the second software 442 can include the context module 502, the query module 504, the search module 506, and the result module 508. The second control unit 434 can execute modules partitioned on the second software 442 as previously described.

The first software 426 can include the presentation module 510. Based on the size of the first storage unit 414, the first software 426 can include additional modules of the electronic system 100. The first control unit 412 can execute the modules partitioned on the first software 426 as previously described.

The first control unit 412 can operate the first communication interface 428 of FIG. 4 to communicate the search context 302, the query 210, the search result 206, or a combination thereof to or from the second device 106. The first control unit 412 can operate the first software 426 to operate the location unit 420. The second communication interface 450 of FIG. 4 to communicate the search context 302, the query 210, the search result 206, or a combination thereof to or from the first device 102.

The electronic system 100 describes the module functions or order as an example. The modules can be partitioned differently. For example, the search module 506 and the result module 508 can be combined. Each of the modules can operate individually and independently of the other modules. Furthermore, data generated in one module can be used by another module without being directly coupled to each other. For example, the query module 504 can receive the search context 302 from the context module 502. The word "communicating" can represent sending, receiving, or a combination thereof.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first device 102, the second device 106, or a combination thereof can collectively refer to all hardware accelerators for the modules. Furthermore, the first device 102, the second device 106, or a combination thereof can be implemented as software, hardware, or a combination thereof.

The modules described in this application can be implemented as instructions stored on a non-transitory computer readable medium to be executed by the first device 102, the second device 106, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

Figure 6:
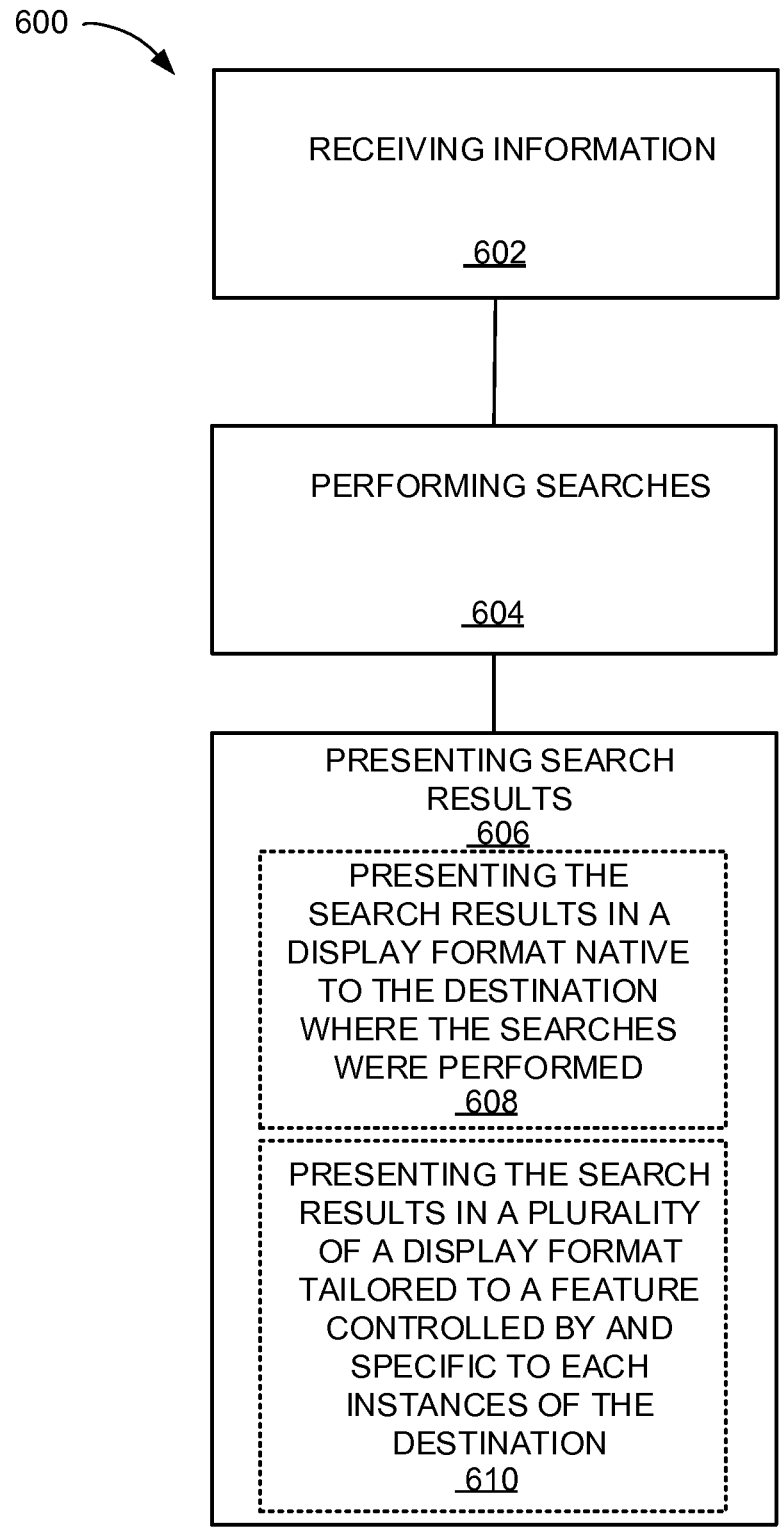
FIG. 6 is an exemplary flow chart of a method of operation of the electronic system of FIG. 1 in a further embodiment.

Referring now to FIG. 6, therein is shown an exemplary flow chart of a method 600 of operation of the electronic system 100 of FIG. 1 in a further embodiment. The exemplary flow chart 600 includes: receiving information related to an user entry under a search context in a block 602; performing searches with a control unit based on the information for searching within the plurality of the destination in a block 604; and presenting search results based on the searches, wherein one instance of the search results is different from another instance of the search results for presenting the search results for the plurality of the destination in a block 606. The step of presenting the search results as presented in block 606 can further include presenting the search results includes presenting the search results for displaying in a display format native to the destination where the searches were performed in a block 608 and presenting the search results in a plurality of a display format tailored to a feature controlled by and specific to each instances of the destination in a block 610.

It has been discovered that the electronic system 100 receiving the information 204 of FIG. 2 related to the user entry 208 of FIG. 2 under the search context 302 of FIG. 3 improves the efficiency of performing a plurality of the search 202 of FIG. 2. More specifically, the electronic system 100 can perform the search 202 based on the information 204 for searching within the plurality of the destination 238. As a result, the electronic system 100 can present a plurality of the search result 206 of FIG. 2 based on a plurality of the search 202, wherein one instance of the search result 206 is different from another instance of the search result 206 for presenting a plurality of the search result 206 for a plurality of the destination 238.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a processor configured to:
receive information related to a user entry under a search context,
generate a query based on identifying multiple instances of a substring from the information including a text entered as the user entry, wherein each of the substring is ranked according to a substring rank in an order relevant to the search context, and
perform searches based on the query to search within applications wherein each of the searches performed by each of the applications is independent from one another and wherein each of the applications is a different classification type from another; and
a user interface, coupled to the processor, configured to concurrently display search results in a format based on the searches and based on a proximity threshold between two devices executing the applications,
wherein a first instance of the search results from a first search performed in a first application type is displayed in a first display format that is native to the first application type and a second instance of the search results from a second search performed in a second application type is displayed in a second display format that is different from the first display format and native to the second application type.

2. The electronic system as claimed in claim 1, wherein the processor is configured to generate a suggestion for the searches based on at least one of a user's interest and an activity context.

3. The electronic system as claimed in claim 1, wherein the user interface is configured to present the search results based on at least one of a display context for selecting an application currently executed as a destination and a display format for each of the search results.

4. The electronic system as claimed in claim 1, wherein the user interface is configured to present the search results in display formats with each of the display formats tailored to a feature controlled by and specific to an application.

5. The electronic system as claimed in claim 1, wherein the processor is configured to perform the searches according to a search timing for performing at least one of the searches in parallel and with a time delay on the applications.

6. The electronic system as claimed in claim 1, wherein the processor is configured to perform the searches based on an application availability for searching in an application suited for an activity context.

7. The electronic system as claimed in claim 1, wherein the processor is configured to perform the searches based on a device availability for searching in an application suited for an activity context.

8. The electronic system as claimed in claim 1, wherein the processor is configured to perform the searches based on a task priority for prioritizing one instance of a device activity over another instance of the device activity.

9. The electronic system as claimed in claim 1, wherein the user interface is configured to present the search results based on a display format representing a slideshow to present each instance of the search results in each instance of slides of the slideshow.

10. The electronic system as claimed in claim 1, wherein:
the processor is configured to:
receive the information related to the user entry for searching in the applications currently executed, and
perform the searches based on the information for searching within the applications, and
the user interface is configured to present the search results based on the searches for presenting the search results for the applications.

11. The electronic system as claimed in claim 1, wherein the processor is configured to concurrently display the search results on a surface other than the electronic system that generated the query.

12. A method of operation of an electronic system comprising:
receiving information related to a user entry under a search context;
generating a query based on identifying multiple instances of a substring from the information including a text entered as the user entry, wherein each of the substring is ranked according to a substring rank in an order relevant to the search context;
performing searches with a processor based on the query to search within applications wherein each of the searches performed by each of the applications is independent from one another and each of the applications is a different classification from another; and
concurrently displaying search results in a format based on the searches and based on a proximity threshold between two devices executing the applications,
wherein a first instance of the search results from a first search performed in a first application type is displayed in a first display format that is native to the first application type and a second instance of the search results from a second search performed in a second application type is displayed in a second display format that is different from the first display format and native to the second application type.

13. The method as claimed in claim 12, further comprising generating a suggestion for the searches based on at least one of a user's interest and an activity context.

14. The method as claimed in claim 12, wherein presenting the search results includes presenting the search results based on at least one of a display context for selecting an application currently executed as a destination and a display format for each of the search results.

15. The method as claimed in claim 12, wherein presenting the search results includes presenting the search results in display formats tailored to a feature controlled by and specific to an application.

16. The method as claimed in claim 12, wherein displaying the search results concurrently based on the searches includes displaying the search results on a surface other than the electronic system that generated the query.

17. A non-transitory computer readable medium including instructions that, when executed by a processor cause the processor to:
receive information related to a user entry under a search context;
generate a query based on identifying multiple instances of a substring from the information including a text entered as the user entry, wherein each of the sub string is ranked according to a substring rank in an order relevant to the search context;
perform searches with the processor based on the query to search within applications wherein each of the searches performed by each of the applications is independent from one another and each of the applications is a different classification from another; and
concurrently display search results in a format based on the searches and based on a proximity threshold between two devices executing the applications,
wherein a first instance of the search results from a first search performed in a first application type is displayed in a first display format that is native to the first application type and a second instance of the search results from a second search performed in a second application type is displayed in a second display format that is different from the first display format and native to the second application type.

18. The non-transitory computer readable medium as claimed in claim 17, the instructions further configured to cause the processor to generate a suggestion for the searches based on at least one of a user's interest and an activity context.

19. The non-transitory computer readable medium as claimed in claim 17, wherein presenting the search results includes presenting the search results based on at least one of a display context for selecting an application currently executed as a destination and a display format for each of the search results.

20. The non-transitory computer readable medium as claimed in claim 17, wherein presenting the search results includes presenting the search results in display formats tailored to a feature controlled by and specific to an application.

21. The non-transitory computer readable medium as claimed in claim 17, wherein displaying the search results concurrently based on the searches includes displaying the search results on a surface other than the processor that generated the query.

* * * * *